(12) United States Patent
Wu et al.

(10) Patent No.: US 9,451,220 B1
(45) Date of Patent: Sep. 20, 2016

(54) SYSTEM AND METHOD FOR ALIGNING A MULTI-SATELLITE RECEIVER ANTENNA

(71) Applicant: The DIRECTV Group, Inc., El Segundo, CA (US)

(72) Inventors: Terence Wu, Torrance, CA (US); Charles P. Palaganas, Cerritos, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 59 days.

(21) Appl. No.: 14/586,804

(22) Filed: Dec. 30, 2014

(51) Int. Cl.
| | | |
|---|---|---|
| *H04B 17/00* | (2015.01) | |
| *H04N 7/20* | (2006.01) | |
| *H01Q 1/12* | (2006.01) | |
| *H04H 40/90* | (2008.01) | |
| *H04N 21/61* | (2011.01) | |

(52) U.S. Cl.
CPC ............... *H04N 7/20* (2013.01); *H01Q 1/125* (2013.01); *H04H 40/90* (2013.01); *H04N 21/6143* (2013.01); *H01Q 1/1257* (2013.01)

(58) Field of Classification Search
CPC ....... H01Q 1/125; H01Q 1/1257; H01Q 5/45
USPC ............ 455/226.1, 226.2, 193.1, 276.1, 289; 342/352, 357.65
See application file for complete search history.

(56) References Cited

U.S. PATENT DOCUMENTS

| | | | |
|---|---|---|---|
| 5,313,215 A * | 5/1994 | Walker | .................. H01Q 3/005 342/352 |
| 5,463,403 A | 10/1995 | Walker | |
| 5,760,739 A | 6/1998 | Pauli | |
| 5,808,583 A | 9/1998 | Roberts | |
| 5,978,716 A | 11/1999 | Kamel | |
| 6,031,507 A * | 2/2000 | Aoki | ...................... H01Q 19/17 343/776 |
| 6,535,177 B1 * | 3/2003 | Dhellemmes | .......... H01Q 1/084 343/765 |
| 6,538,612 B1 | 3/2003 | King | |
| 6,600,730 B1 * | 7/2003 | Davis | ................. H04B 7/18517 370/343 |
| 6,686,889 B1 | 2/2004 | Kwon | |
| 6,693,587 B1 * | 2/2004 | Kuether | ............... H01Q 1/1257 342/359 |
| 6,937,188 B1 * | 8/2005 | Saunders | ............. H01Q 1/1257 342/359 |
| 7,016,643 B1 * | 3/2006 | Kuether | ................. H01Q 3/245 342/359 |
| 7,595,764 B2 | 9/2009 | Shuster | |
| 8,260,567 B1 | 9/2012 | Kaplan | |

(Continued)

FOREIGN PATENT DOCUMENTS

| | | |
|---|---|---|
| CN | 1700516 A | 11/2005 |
| EP | 0548844 B1 | 11/1997 |

*Primary Examiner* — Duc M Nguyen (57) ABSTRACT

A system and method for aligning an outdoor antenna reflector unit (ODU) with multiple satellites is disclosed. The method may rely on multiple satellites as alignment anchor points to reduce ODU alignment pointing error. The method may require at least three measurements of signal power at different angles for each satellite link to determine the ODU antenna pattern for each satellite link. A peak angle is then calculated for each satellite link based on the determined satellite link ODU antenna pattern. Once the satellite link peak angles are determined, the average peak angle can be calculated and used for aligning the ODU to the multiple satellites. The method may further reduce pointing error by using satellites transmitting within the $K_a$ frequency band as alignment anchor points. The method may simplify ODU alignment by merely requiring an installer to adjust an ODU alignment screw based on the calculated average peak angle.

20 Claims, 10 Drawing Sheets

(56) References Cited

U.S. PATENT DOCUMENTS

| | | |
|---|---|---|
| 8,296,096 B2 | 10/2012 | Kirby |
| 8,554,466 B2 | 10/2013 | Hsu |
| 8,837,782 B1 | 9/2014 | Rosenwinkel |
| 8,982,004 B1* | 3/2015 | Santoru ............... H01Q 1/1257 343/757 |
| 9,281,559 B2 | 3/2016 | Ransom |
| 2002/0000931 A1* | 1/2002 | Petronic ............... H01Q 1/125 342/359 |
| 2002/0084941 A1* | 7/2002 | Matz ............... H01Q 1/1221 343/760 |
| 2003/0016172 A1* | 1/2003 | Natsume ............... H01Q 1/125 342/359 |
| 2004/0128689 A1 | 7/2004 | Pugel |
| 2006/0020978 A1 | 1/2006 | Miyagawa |
| 2007/0080861 A1* | 4/2007 | Norin ............... H01Q 1/1257 342/359 |
| 2007/0150923 A1 | 6/2007 | Okamoto |
| 2008/0018995 A1 | 1/2008 | Baun |
| 2008/0165070 A1* | 7/2008 | Stroes ............... H01Q 1/1257 343/757 |
| 2009/0033576 A1 | 2/2009 | Smoyer |
| 2013/0127665 A1 | 5/2013 | Miller |
| 2013/0135146 A1 | 5/2013 | Ransom |
| 2013/0271319 A1 | 10/2013 | Trerise |
| 2014/0315599 A1 | 10/2014 | Teichmann |
| 2015/0026737 A1 | 1/2015 | Miller |
| 2015/0219744 A1 | 8/2015 | Eikenberry |
| 2015/0257126 A1 | 9/2015 | Herz |
| 2016/0036117 A1 | 2/2016 | Whitley |
| 2016/0056525 A1 | 2/2016 | Hansryd |

\* cited by examiner

SYSTEM AND METHOD FOR ALIGNING A MULTI-SATELLITE RECEIVER ANTENNA

CROSS REFERENCE TO RELATED APPLICATION

This application is related to the following co-owned application Ser. No. 14/586,777, entitled "Remote Display of Satellite Receiver Information", filed on Dec. 30, 2014, the same day as the present application, the contents of which are incorporated by reference herein in their entirety.

BACKGROUND

Satellite broadcasting of communication signals is a common method for transmitting data. For example, commercial signals for television programming can be distributed by way of one or more satellites from a provider to multiple commercial television programming subscribers. Typically, each subscriber relies on an antenna to receive the commercial television programming signals distributed from the provider by way of the one or more satellites. In order for the subscriber to properly receive signals from the satellites, the antenna of a subscriber needs to be properly aligned with the transmitting satellites. Poor signal reception can cause interruptions in television programming service, which in turn would diminish the subscriber's television programming viewing experience. Thus, a need for accurate alignment of an antenna to multiple satellites exists.

SUMMARY

Ideally, an improved method for aligning a multi-satellite outdoor antenna reflector unit (ODU) would improve on the drawbacks of existing methods. While current methods of coarse alignment may be sufficient for an ODU receiving signals from one satellite, coarse alignment of an ODU receiving signals from multiple satellites is insufficient due to poor angular accuracy.

Current methods for fine alignment of an ODU may improve upon the drawbacks of coarse alignment. However, even current methods for fine alignment of an ODU contain drawbacks for aligning an ODU receiving signals from multiple satellites. In particular, current fine alignment methods use only one satellite as an anchoring point for aligning the ODU. As a result, current fine alignment methods fail to effectively reduce pointing error between the ODU and other non-anchor point satellites.

Another drawback is that current alignment methods rely on satellites transmitting within the $K_u$ frequency band as anchor points. However, satellite transmissions within the $K_u$ frequency band are not as sensitive to angular displacement of the ODU as satellites transmissions in other frequency bands. As a result, alignment with $K_a$ satellites may not be as accurate as satellites operating within other frequency bands.

Yet another drawback of existing alignment methods is that current alignment methods of the ODU are difficult for an installer (especially a first time installer, such as a new subscriber) to execute. Current methods for fine alignment of the ODU may require an installer to 1) turn an adjustment screw, 2) accurately count the number of turns of the adjustment screw, and 3) listen in real-time for a stop signal indicating to stop turning the screw. Because this multi-task procedure is difficult for first time installers to execute, fine alignment of an ODU with multiple satellites using current methods may not be as accurate as possible. Thus, a solution addressing the drawbacks of current ODU alignment methods is needed.

The example embodiments described herein may help to align an ODU to multiple satellites, and may address some or all of the drawbacks of current ODU alignment methods. For example, the disclosed methods may allow the ODU to align to multiple satellites by using multiple satellites as anchoring points during alignment. The anchoring point satellites are not required to transmit within the $K_u$ frequency band. For example, an anchoring satellite point could instead transmit within the $K_a$ frequency band.

Example embodiments may involve an ODU fine alignment process that is implemented after a coarse alignment of the ODU is performed. The fine alignment process uses multiple satellites as anchoring points by taking measurements at three or four different ODU orientations. Each measurement includes a signal power measurement for each satellite used as an anchoring point. Thus, for each satellite, at least three signal power measurements at three different orientations of the ODU may be obtained.

Once the measurements are obtained, the three measurements for each satellite are used to determine an antenna pattern, which is typically a parabola. After determining the ODU antenna pattern for each satellite link, a peak angle for each satellite is calculated by determining the peak of the calculated antenna pattern parabola. Once the multiple satellite peak angles are calculated, an average peak angle can be determined based on the calculated satellite peak angles. The ODU may then be set to the average peak angle to complete fine alignment of the ODU with multiple satellites.

The ODU fine alignment process may address some or all of the drawbacks of previous ODU alignment methods. First, the ODU fine alignment process may effectively reduce the pointing error of the ODU to multiple satellites by using multiple satellites as anchoring points during ODU alignment. Second, the ODU fine alignment process may rely on satellites transmitting signals within the more sensitive $K_a$ frequency band than the $K_u$ frequency band. Third, the ODU fine alignment process may no longer require an installer to execute the multitask procedure for ODU alignment (which is discussed in further detail with FIG. 5).

In a first aspect, an example method involves receiving signal power information for a multi-satellite outdoor antenna reflector unit (ODU); based on the signal power information, determining, by a computing device, a first peak angle for the ODU to establish a first satellite link with a first satellite; based on the signal power information, determining, by the computing device, a second peak angle for the ODU to establish a second satellite link with a second satellite; determining an average peak angle based at least in part on the determined first peak angle and second peak angle; and providing, on a graphical user interface, an indication of the average peak angle to facilitate alignment of the ODU to concurrently establish both the first and the second satellite links.

In a second aspect, an example non-transitory computer-readable medium stores instructions that are executable by a computing device, wherein executing the instructions causes the computing device to perform functions including receiving signal power information for a multi-satellite outdoor antenna reflector unit (ODU); based on the signal power information, determining a first peak angle for the ODU to establish a first satellite link with a first satellite; based on the signal power information, determining a second peak angle for the ODU to establish a second satellite link with a second satellite; determining an average peak angle based at least in part on the determined first peak angle and second peak angle; and providing, on a graphical user interface, an indication of the average peak angle to facilitate alignment of the ODU to concurrently establish both the first and the second satellite links.

In a third aspect, an example system includes a multi-satellite outdoor antenna reflector unit (ODU); a signal power measurement device that determines a signal power of a signal received by the ODU; and a peak angle calculation device that includes a processor; and a memory storing instructions that when executed by the processor cause the device to perform functions including receiving signal power information for the ODU; based on the signal power information, determining a first peak angle for the ODU to establish a first satellite link with a first satellite; based on the signal power information, determining a second peak angle for the ODU to establish a second satellite link with a second satellite; determining an average peak angle based at least in part on the determined first peak angle and second peak angle; and providing an indication of the average peak angle to facilitate alignment of the ODU to concurrently establish both the first and the second satellite links.

These, as well as other aspects, alternatives, and advantages, will become apparent to those of ordinary skill in the art by reading the following detailed description, with reference where appropriate to the accompanying drawings.

DETAILED DESCRIPTION

I. Overview

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

Figure 1A:
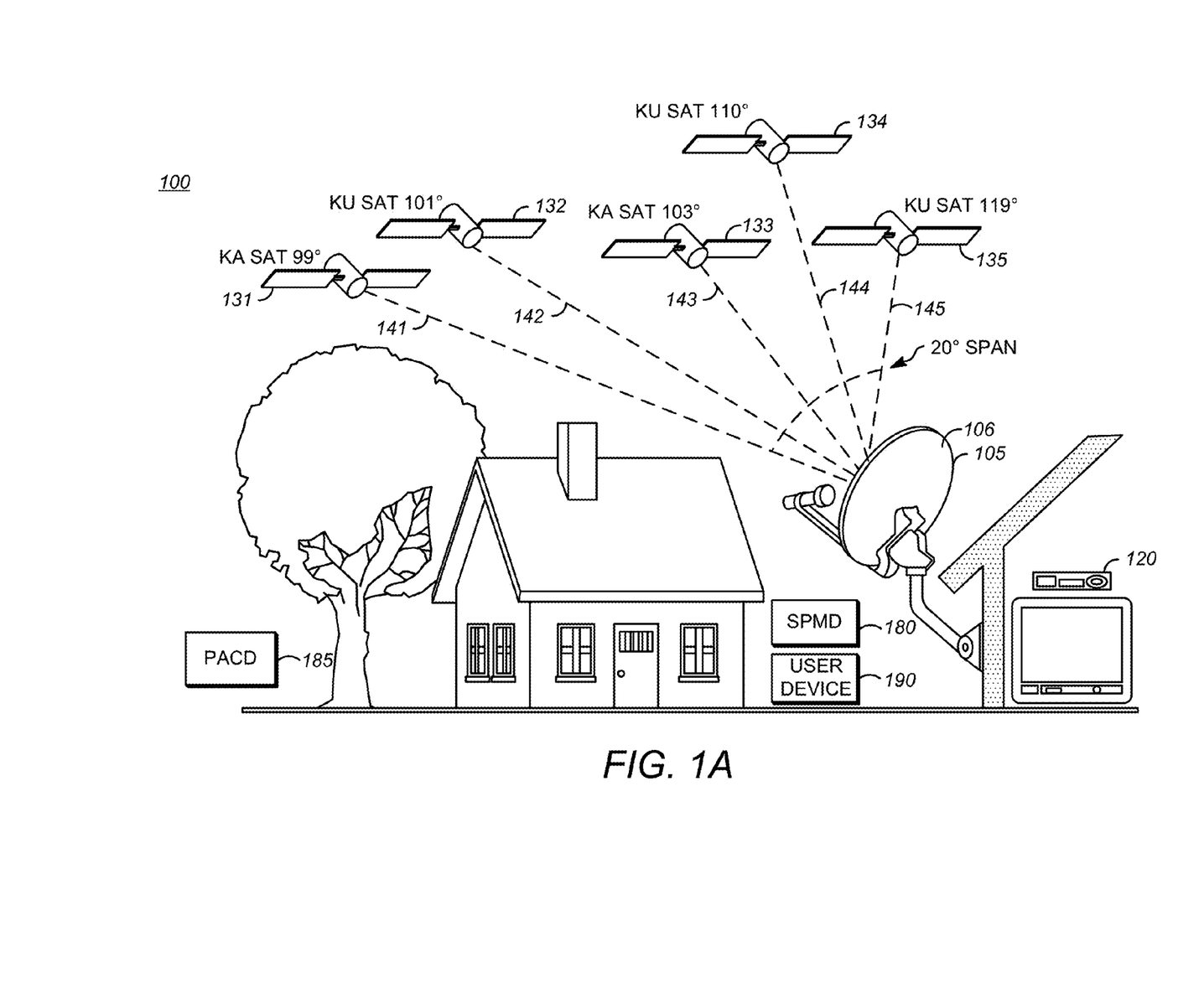
FIG. 1A illustrates a multiple satellite ODU alignment environment.

FIG. 1A illustrates an ODU alignment environment 100. The environment 100 includes ODU 105, set-top box 120, satellite 131, satellite 132, satellite 133, satellite 134, satellite 135, signal power measuring device (SPMD) 180, peak angle calculation device (PACD) 185, and user device 190. In some embodiments, the environment 100 includes more, less, and/or different devices than those shown in FIG. 1A.

ODU 105 includes antenna reflector 106 (also referred to as antenna, reflector, and/or dish throughout the specification). ODU 105 may receive signals from all five satellites, 131-135, and provide the received satellite signals to set-top box 120. Set-top box 120 is described later in further detail with FIG. 1E. For a subscriber to receive uninterrupted, high quality media data service by way of set-top box 120, ODU 105 may be accurately aligned at an azimuth, elevation, and tilt angle so that the five satellites at various orbital slots can be received. Thus, the antenna reflector 106 may be adjusted to align ODU 105 so that the five feeds on the integrated Low Noise Block Feed (LNBF) can simultaneously receive the signals from satellites at five geostationary orbital slots.

FIG. 1A displays an example of five satellites 131-135 located at five different geostationary orbital slots that transmit signals to ODU 105. Each satellite displayed in FIG. 1A lists the geostationary orbital slot at which the satellite is located and the frequency band within which the satellite transmits. For example, satellite 131 is located at geostationary orbital slot 99° and transmits within the $K_a$ frequency band. For another example, satellite 132 is located at geostationary orbital slot 101° and transmits signals within the $K_u$ frequency band. In other embodiments, each satellite could be located at a different geostationary orbital slot and transmit within a different frequency band. Furthermore, in other embodiments, more or fewer than five satellites transmit signals to ODU 105.

In the displayed embodiment of FIG. 1, satellites 131-135 are configured to send and receive digital or analog signals to one or more devices in environment 100. All five satellites 131-135 receive an uplink signal from a head end 130 (shown in FIG. 1E) and transmit a corresponding downlink signal to ODU 105. For example, satellite 131 establishes a satellite link with ODU 105 by transmitting downlink signal 141 to ODU 105. For another example, satellite 132 establishes a satellite link with ODU 105 by transmitting downlink signal 142 to ODU 105.

In some embodiments, all five downlink signals are characterized by a polarization. For example, in FIG. 1A, all five displayed downlink signals (141-145) may be characterized by a right hand circular polarization (RHCP). In this case, all five satellites are capable of establishing a second satellite link by transmitting a corresponding second downlink signal characterized by a polarization different from the first downlink signal polarization (RHCP).

For example, satellite 131 may establish a second satellite link with ODU 105 by transmitting a second downlink signal 161 (not displayed) to ODU 105. For another example, satellite 132 may establish a second satellite link with ODU 105 by transmitting a second downlink signal 162 (not displayed) to ODU 105. Additionally, all five of the second downlink signals 161-165 (not displayed) may be characterized by a left hand circular polarization (LHCP), which is different from the RHCP of all five of the first downlinks (141-145). As a result, the second downlink signals may not interfere with the first downlink signals due to their different polarization. In other embodiments, different polarizations are possible for the first and second downlinks.

Figure 1B:
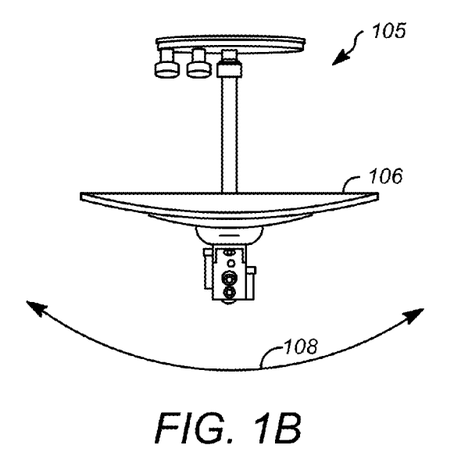
FIGS. 1B, 1C, and 1D illustrate azimuth, elevation, and rotational (tilt) adjustments of an ODU.
Figure 1C:
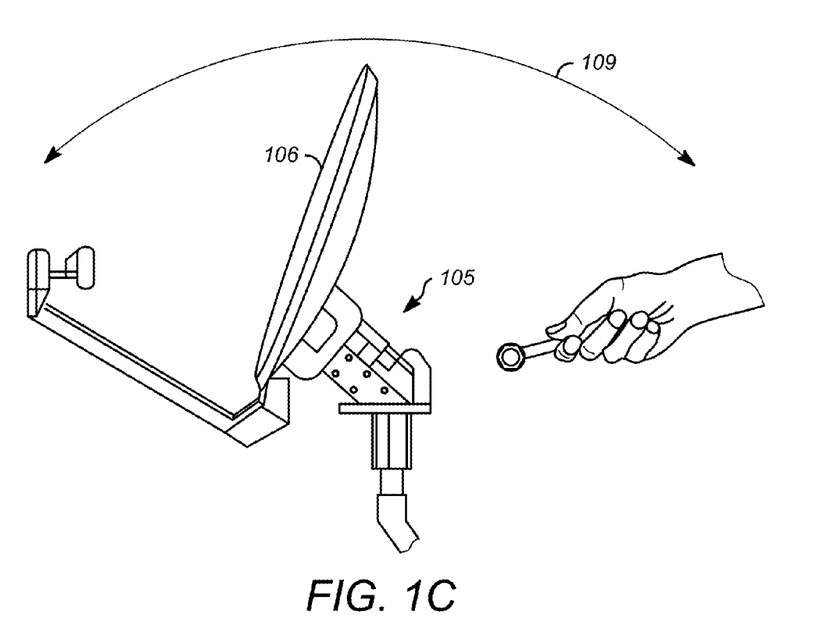
Figure 1D:
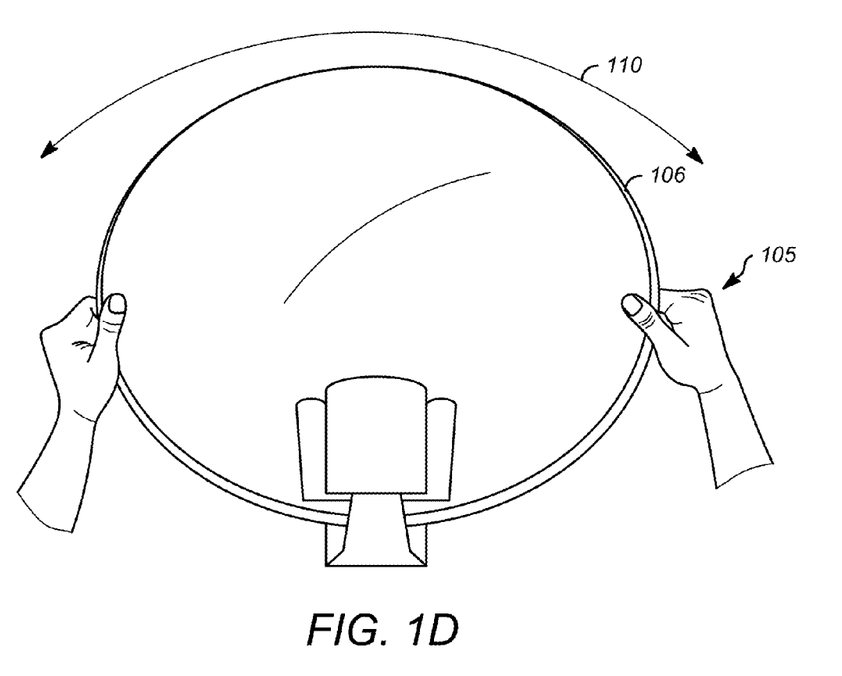

To help more accurately align an ODU, alignment is typically evaluated and adjusted using azimuth, elevation, and tilt angles so that signals from multiple satellites (e.g., satellites 131-135) can be received by an ODU (e.g., ODU 105). FIGS. 1B, 1C, and 1D illustrate different adjustments of an ODU. FIGS. 1B, 1C, and 1D all display ODU 105, which includes antenna reflector 106. FIG. 1B demonstrates how to adjust the ODU 105 in the azimuth direction 108. FIG. 1C illustrates how to adjust the ODU 105 in the elevation direction 109. FIG. 1D shows how to adjust the ODU 105 in the tilt direction 110.

Figure 1E:
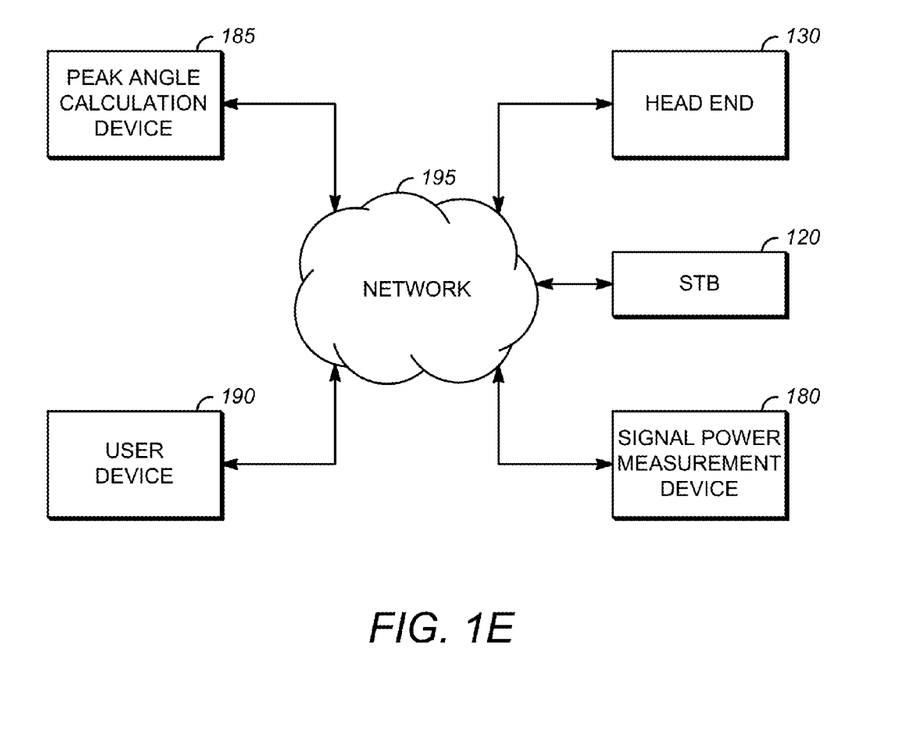
FIG. 1E illustrates an example block diagram of an ODU alignment network environment.

FIG. 1E is a simplified block diagram that illustrates an ODU alignment network environment 102 in which embodiments of the disclosed methods and entities can be implemented. The network environment 102 may include a head end 130, one or more set-top boxes 120, one or more peak angle calculation devices (PACD) 185, one or more signal power measurement devices (SPMD) 180, one or more user devices 190, and one or more networks 195. Other devices may also be included in the network environment 102. It should be understood that, although not illustrated, multiple satellites, head ends, servers, user devices, set-top boxes, and other components might be included in the network environment 102. Moreover, while multiple components are illustrated separately, it should be understood that one or more of the components may be implemented as distributed components.

Head end 130 may include a transmitting antenna for communicating data using one or more signals. For instance, the head end transmitting antenna may send signals to one or more satellites, including satellites 131-135. Satellites 131-135 may in turn send downlink signals 141-145 (and 161-165) to a receiving device, such as antenna reflector 106 and set-top box 120. In another instance, head end 130 may communicate data to set-top box 120 via a network 195. Network 195 may be representative of one or more types of networks, such as a public switched telephone network, the Internet, a mobile telephone network, or other type of network.

Set-top box 120 is an example of a receiving device configured to receive data from satellites 131-135 or network 195. For example, set-top box 120 may include or be connected to an antenna reflector 106 for receiving downlink signals from satellites 131-135. Set-top box 120 may also include one or more components structured and arranged to receive signals from network 195. The type, content, and number of signals received by set-top box 120 may vary. For instance, the signals may be media signals that may include video or audio signals. Data sent via the media signals may include content, program data, images, requests, or the like. Other examples are also possible.

In some examples, set-top box 120 may be interconnected with one or more devices in the network environment 102 via a local network (not illustrated). The local network, which may be a wired network or wireless network, may be used to interconnect set-top box 120 within a household, multi-dwelling unit, or commercial building. The local network may also allow for multi-room viewing of content stored on a first set-top box (such as set-top box 120) and communicated in to a second set-top box (such as set-top box 121, not pictured) through the local network. The stored content can comprise content a set-top box 120 receives from antenna 106.

User device 190 may include a variety of stationary or mobile computing devices. For example, user device 190 may include a landline telephone, cellular telephone, smartphone, personal computer, laptop computer, tablet computer, personal digital assistant (PDA), smartwatch, smart glasses, portable media player, or other computing device now known or later developed. User device 190 may be configured to send or receive data in a variety of ways. For example, user device 190 may receive downlink signals from antenna reflector 106. In another example, user device 190 may send or receive signals from network 195. In yet another example, user device 190 may send or receive signals from one or more devices in the network environment 102. For instance, user device 190 may send or receive signals from set-top box 120 via network 195. Other examples are also possible.

Signal power measuring device (SPMD) 180 may be used by an installer of the ODU 105 to measure a satellite signal received by the ODU 105 during ODU alignment. The signal power measuring device 180 may be an installation meter, signal power meter, signal quality meter, or some other device that measures a satellite signal received by the ODU 105. The measurements from signal power measuring device 180 are used to determine an ODU antenna pattern for a satellite during ODU alignment. Thus, device 180 may measure signal power, signal quality, signal noise, and/or any other signal trait(s) to determine the ODU antenna pattern for the received satellite signal during ODU alignment.

In FIG. 1E, the signal power measuring device 180 may communicate by way of network 195 with the head end 130, a peak angle calculation device 185, a user device 190, and/or set-top box 120. In the displayed embodiments of FIGS. 1A and 1E, the signal power measuring device 180 is a separate device. However, in other embodiments, the signal power measuring device 180 may be integrated with other devices, including ODU 105, user device 190, peak angle calculation device 185, set-top box 120, and/or other equipment.

Peak angle calculation device (PACD) 185 may be used by an installer of the ODU 105 to determine an angle at which to set the ODU 105 to ensure proper alignment with one or more satellites. The peak angle calculation device may communicate by way of network 195 with the head end 130, the signal power measuring device 180, a user device 190, and/or set-top box 120. In the displayed embodiments of FIGS. 1A and 1E, the peak angle calculation device 185 is a separate device. However, in other embodiments, the peak angle calculation device 185 may be integrated with other devices, including ODU 105, user device 190, signal power measuring device 180, set-top box 120, head end 130, and/or other equipment.

II. Prior Method of Aligning an ODU to One or More Satellites

Currently, an ODU can be coarsely aligned by finding the maximum received signal power towards one satellite with the use of a power meter, signal quality meter, or set-top-box (STB). Coarse alignment is sufficient for single satellite pointing where adjacent satellite interferences are not critical. However, for multiple satellite alignment, the coarse alignment accuracy is not reliable enough because of poor angular accuracy.

Figure 2:
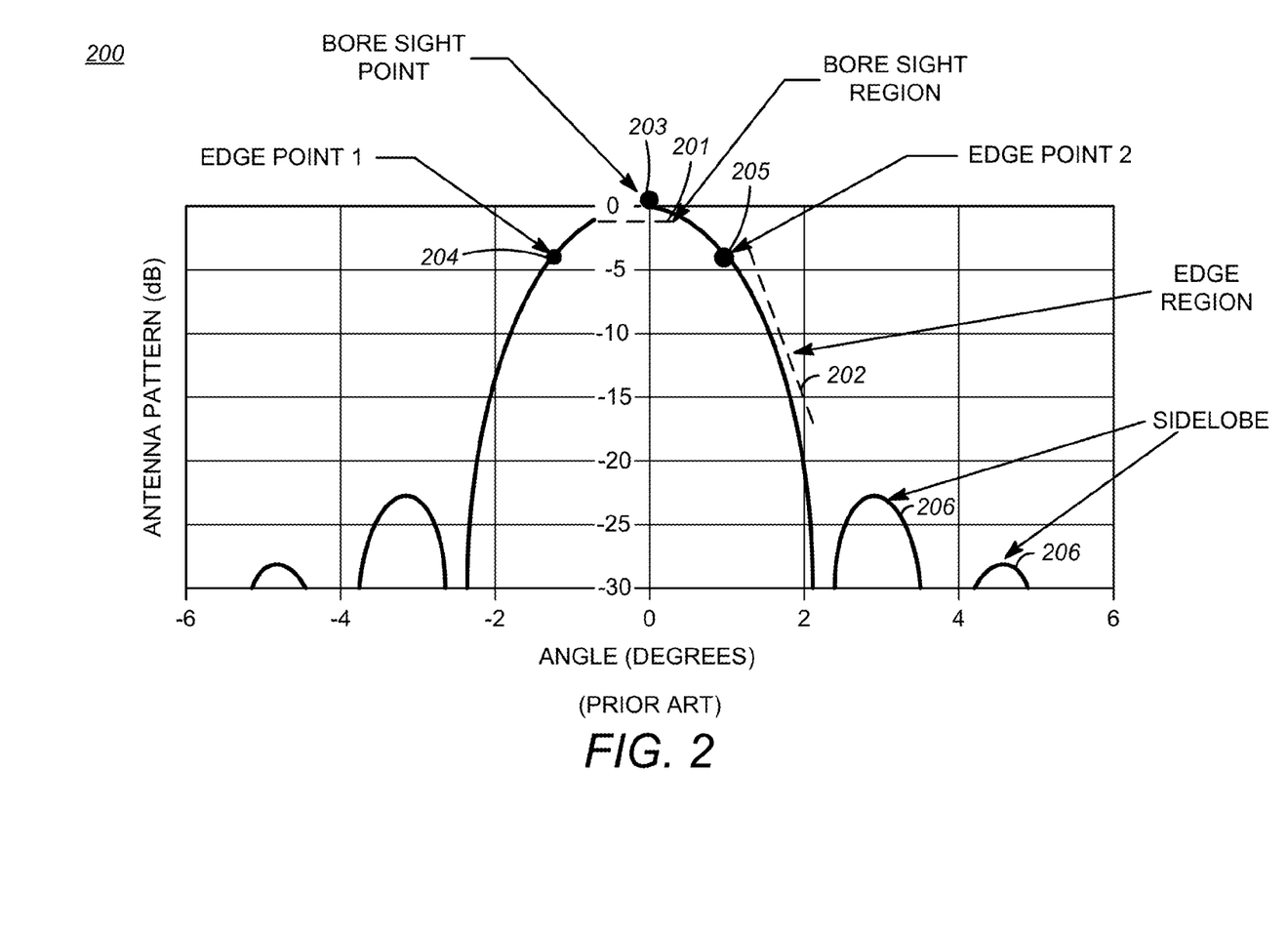
FIG. 2 illustrates an example of an ODU antenna pattern for a signal received from a satellite transmitting within the $K_u$ frequency band.

FIG. 2 illustrates an example of an ODU antenna pattern for a signal received from a satellite transmitting within the $K_u$ frequency band. The antenna pattern of an ODU is flat at bore sight region 201. Thus, the ODU antenna pattern is not sensitive to angular errors near the peak. As a result, when coarse alignment is done, the ODU may be pointed to a wide angular range around the anchor satellite, which may be acceptable for bore sight region 201.

However, the slope of the ODU antenna pattern at the edge region 202 drops off sharply. In a multi-satellite alignment, non-anchoring satellites may be near the edge region 202 that is highly sensitive to angular displacement. Also, interference from adjacent satellites is rejected along the edge of the antenna pattern. Thus, coarse alignment of an ODU to one satellite is insufficient for aligning an ODU receiving signals from multiple satellites. To address these problems, a fine alignment method is needed to reduce the angular alignment error in ODU installation.

The existing ODU fine alignment method uses the edge of the bore sight pattern to center the beam, as shown in FIG. 2. In particular, edge points 204 and 205 are more sensitive to angular displacement then bore sight 203. As a result, edge points 204 and 205 can be used to accurately align an ODU to one satellite, which is referred to as the anchoring satellite.

For this existing ODU fine alignment method, the angle between the two edge points 204 and 205 is obtained by counting the number of turns on a fine adjustment dial. Specifically, the dial is set to zero for an edge point 204. Next, the installer 1) turns the dial, 2) accurately counts the number of turns, and 3) listens for the stop signal when the second edge point 205 is reached. The ODU is adjusted to the bore sight point 203 for the anchoring satellite by turning back half of the number of counted turns from edge point 205.

Because three simultaneous actions are required for this method (turning, counting, and listening), the procedure requires practice and is difficult for first time installers. Also, the procedure requires equipment that provides real-time feedback of the stop signal to notify the installer that the second edge 205 has been reached. Furthermore, this procedure only allows alignment to one anchor satellite. In particular, the current method of fine alignment requires using satellite 132 (which operates within the Ku frequency band of 12.2 GHz to 12.7 GHz) as the anchoring satellite. Thus, multiple satellites cannot be used as anchoring points for existing methods of ODU fine alignment. Even further, the anchoring satellite must be a satellite that transmits within a frequency band that is not as sensitive to angular displacement as the $K_a$ frequency band. Consequently, the current method of fine alignment does not adequately reduce pointing errors between the ODU and multiple satellites.

III. Fine Alignment Anchoring Satellites can Transmit within the $K_a$ Frequency Band One possible benefit of the ODU fine alignment process is that ODU alignment is no longer restricted to using satellite 132 (which transmits between 12.2 GHz and 12.7 GHz) as an anchoring point for ODU alignment. Instead, the ODU fine alignment process may permit anchoring to satellites transmitting within frequency bands that are more sensitive to angular displacement. In particular, satellites transmitting within the $K_a$ frequency band, such as satellites 131 and 133 (both of which transmit between 18.3 GHz and 20.2 GHz), may be used as anchoring points for ODU alignment.

Figure 3:
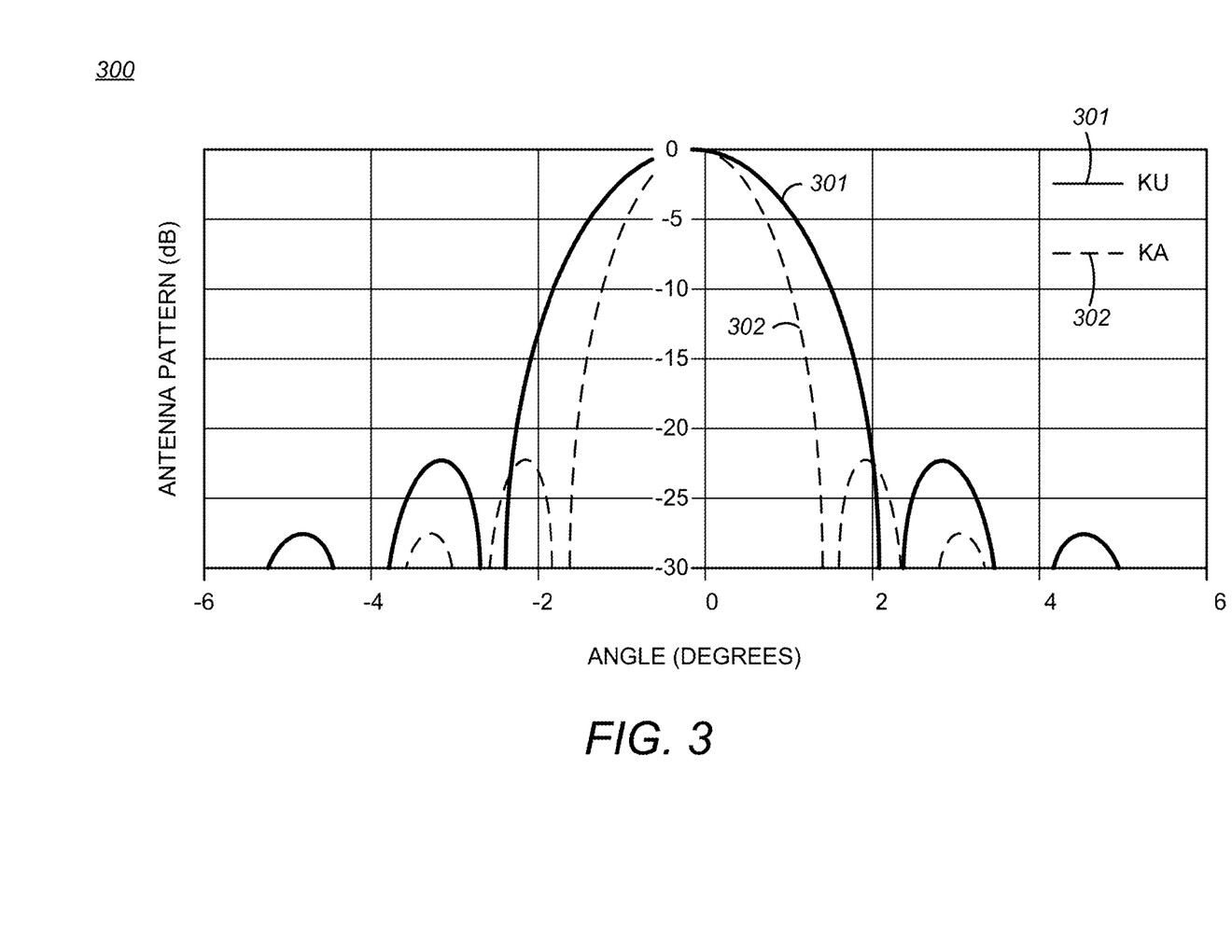
FIG. 3 illustrates an example of an ODU antenna pattern comparison between a signal received from a satellite transmitting within the $K_u$ frequency band and a signal received from a satellite transmitting within the $K_a$ frequency band.

FIG. 3 illustrates an example of an ODU antenna pattern comparison 300 between a signal received from a satellite transmitting within the $K_u$ frequency band and a signal received from a satellite transmitting within the $K_a$ frequency band. FIG. 3 shows that the $K_a$ antenna pattern 302 is more sensitive to angular displacement than the $K_u$ antenna pattern 301. In particular, at an angle of 1°, the $K_u$ antenna pattern merely drops by five dB, whereas the $K_a$ antenna pattern drops by ten dB. The steeper slope of the $K_a$ antenna pattern at 1° indicates a signal that is more sensitive to angular displacement than the $K_u$ antenna pattern signal.

By using satellites that transmit within frequency bands that are more sensitive to angular displacement as anchoring points, the ODU fine alignment process may improve ODU alignment accuracy. Furthermore, fewer angular adjustments may be needed when performing a fine adjustment with $K_a$ band satellites.

IV. Reducing Pointing Error by Using Multiple Anchoring Satellites

Another possible benefit of the ODU fine alignment process is that ODU alignment may achieve a higher accuracy because the process uses multiple satellites for anchoring points. By directly measuring all satellite links that are sensitive to angular displacement, the ODU fine alignment process may have a higher accuracy and reduce pointing error more effectively than previous ODU alignment methods.

Figure 4:
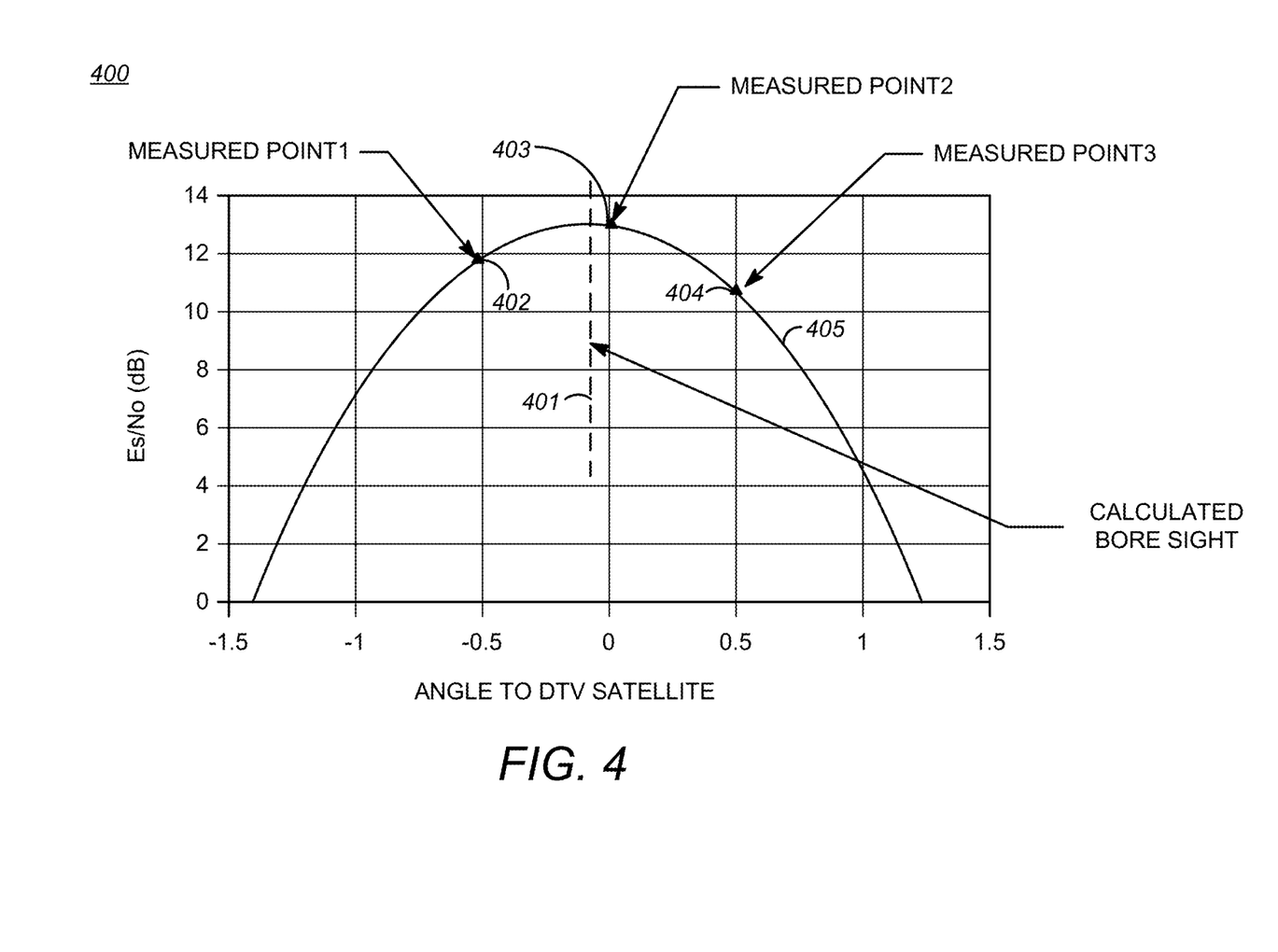
FIG. 4 illustrates an example ODU antenna pattern and bore sight calculation based on at least three measured points.

FIG. 4 illustrates an example diagram 400 of an ODU antenna pattern 405 and bore sight calculation 401 based on at least three measured points 402, 403, and 404. The ODU fine alignment process may align each anchoring satellite by calculating the bore sight point 401 of the ODU based on three arbitrary measured points 402, 403, and 404, as shown in FIG. 4.

For one given satellite link, the process first approximates the ODU's antenna pattern to be close to a quadratic equation where y is the measured signal power or signal over noise reading (Es/No) in dB, and x is the measured angle. The unit of the measured angle is arbitrary. The measured angle can be represented in degrees or in number of screw turns, as long as the representation is consistent. Values a, b and c are unknown constants that are solved based on the three arbitrary points 402, 403, and 404. By obtaining received power or signal strength levels $y_1$, $y_2$, and $y_3$ at three arbitrary angles $x_1$, $x_2$, and $x_3$, the measured data can be converted to equation form, where values a, b, and c may be solved for with $x_1$, $x_2$, $x_3$ and $y_1$, $y_2$, $y_3$.

The peak of the parabolic equation is located at peak angular location x0. The peak angular location x0 is obtained by solving the quadratic equation for x when dy/dx=0.

In order to achieve multiple satellite alignment, measurement points for different satellite links may be collected into a transponder set. Transponder sets TS1, TS2, and TS3 are measured at different dial angles when a "collect" command is instructed. A downlink transponder is an allocated frequency spectrum broadcasted by a satellite. By collecting link quality data from multiple transponders, alignment to multiple anchor satellites may be realized. In this example, transponders from the most angular sensitive satellite links are selected in the measurement set. The ODU exhibits angular sensitivity towards $K_a$ band satellites, which are satellites 131 and 133 from FIG. 1A. The three measurement sets TS1, TS2 and TS3 are used to derive a set of bore sight angles for the anchoring satellites.

Once the three transponder sets are collected, the process calculates a peak angle for each satellite link and produces a set of peak angle results.

The average value of these peak angles is the output that installers receive for adjusting the ODU. The average value of the peak angles may be the compromised peak angle that best aligns to all satellites links measured in the set. In other embodiments, the median value of the peak angles determined above may be the compromised peak angle outputted to installers. In different embodiments, other methods are used to determine a compromised peak angle to best align the ODU to all satellite links measured in the set.

Another possible benefit of the ODU fine alignment process is that the system may verify ODU alignment to make sure the installer has performed the installation correctly. While deriving the peak angle set values a, b and c are already solved. By plugging in the average peak angle, the signal strength expected after alignment is represented where $X_{Avg}$ is the average peak angle derived from the Peak Angle Set. Alignment to four satellite links produces the same number of values (four) of a, b and c for calculating the expected signal strength.

V. Simplified Fine Alignment Procedures for First Time Installers

Yet another possible benefit of the exemplary ODU fine alignment methods is that the fine alignment procedure for an installer may be simplified. Previous methods required an installer to 1) turn a screw, 2) counts the number of screw turns accurately, and 3) listen in real time for a stop signal.

However, for the ODU fine alignment process, the installer may simply turn a dial to an instructed value and collect signal power data roughly three or four times. Each "collect" command may be triggered by the installer's input to a signal power measurement device 180, a set-top box 120, a user device 190, or some other device. The installer may input the "collect" command after the installer has turned to an instructed angle value. After each "collect" command, the system may then instruct the installer to turn the dial to an instructed value based on the collected data.

Specifically, when the data is being collected, three cases may occur based on the location of the first transponder set relative to the peak of the beam. For each case, the relative location of each transponder set with respect to other transponder sets varies. The system may compute and output the instructed value by determining which case is applicable to the collected data.

For all three cases, the reference angle that denotes zero angular value may be reset to the angle where the last transponder set is collected. This scheme enables the output angle to be directly applied to the latest alignment Once all of the three or four data measurements are collected, the system may then output the correct dial count or angular location for the installer to align the ODU. As a result, the ODU fine alignment process may eliminate the difficult multi-task procedures of the previous method. Furthermore, the ODU fine alignment process may be completed without equipment with real-time feedback.

Figure 5:
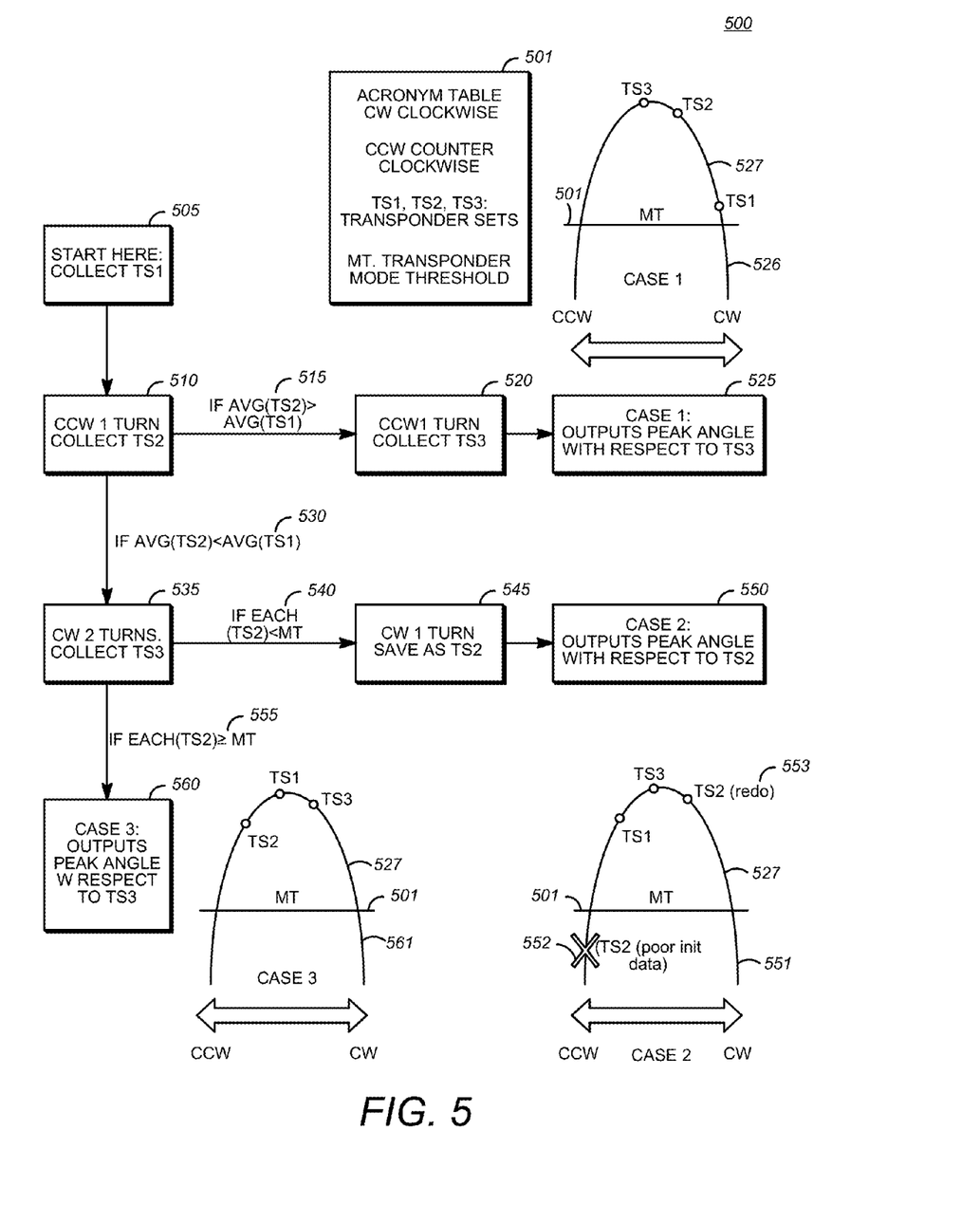
FIG. 5 illustrates an example logic state machine regarding collecting signal data for determining an ODU antenna pattern.

FIG. 5 illustrates an example logic state machine 500 regarding collecting signal data for determining antenna patterns to align the ODU. In particular, logic state machine 500 explains how the three transponder sets, TS1, TS2, and TS3 are collected, how the system processes the three (or four) collected transponder sets, and how the system provides dial turn instructions to the installer.

For all three cases displayed in FIG. 5, the system begins at step 505 by collecting TS1. Next, at step 510, the system instructs the installer to make one counterclockwise turn and collect TS2.

For case one, the system determines at step 515 that the average (AVG) values of TS2 are larger than the average values of TS1. As a result, the system proceeds to step 520 and instructs the installer to make one counterclockwise turn and collect TS3. Next, the system proceeds to step 525 and outputs the peak angle with respect to the reference angle TS3 (the last collected transponder set). The peak angle for case one corresponds to the peak angle calculated based on the antenna pattern 527 displayed for the case one diagram 526. The peak angle is calculated from the transponder sets as described above.

For cases two and three, after step 510, the system determines at step 530 that the average values of TS2 are less than the average values of TS1 and proceeds to step 535. At step 535, the system instructs the installer to make two clockwise turns and collect TS3.

For case two, at step 540, the system determines that at least one of the values of TS2 is below the transponder mode threshold (MT). As a result, the system proceeds to step 545 and instructs the installer to make one clockwise turn and collect revised data to save as TS2. After step 545, the system outputs the peak angle with respect to the reference angle for the revised TS2 (the last collected transponder set, 553). The peak angle for case two corresponds to the peak angle calculated based on the antenna pattern 527 displayed for the case two diagram 551. The peak angle is calculated from the transponder sets as described above. The initial TS2 data collection 552 is discarded because the data was poor (i.e., below the MT).

For case three, at step 555, the system determines that each value of TS2 is greater than or equal to the MT. As a result, the system proceeds to step 560 and outputs the peak angle with respect to the reference angle for TS3 (the last collected transponder set). The peak angle for case three corresponds to the peak angle calculated based on the antenna pattern 527 displayed for the case three diagram 561. The peak angle is calculated from the transponder sets as described above.

The transponder mode threshold (MT) may be determined by selecting a value that prevents poor or bad data from being collected and used to calculate a peak angle. In other embodiments, different methods may be used to determine a transponder mode threshold.

For the ODU fine alignment process, angular motion may be achieved with clockwise and counter-clockwise turns of a fine angular adjustment knob for the ODU. However, in other embodiments, fine angular motion can be achieved with other methods, such as electronic beam steering, or motor-based steering mechanisms. Additionally, in other embodiments, a scheme different from the scheme displayed in FIG. 5 may be used for providing angular motion by way of clockwise and counterclockwise turns of an ODU fine angular adjustment knob.

VI. Example Method for Fine Alignment of an ODU to Multiple Satellites

Figure 6:
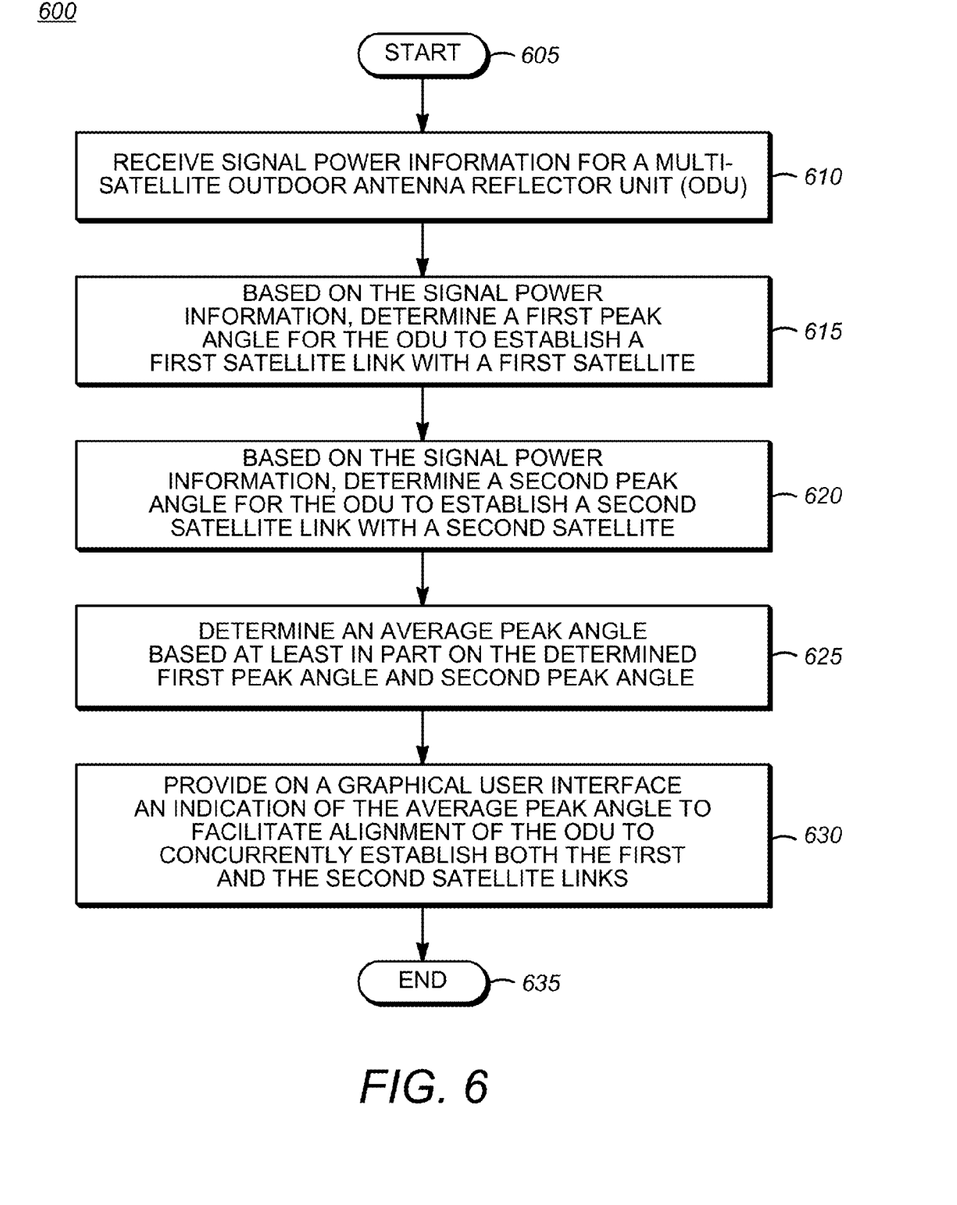
FIG. 6 is a flow chart depicting the steps of an example ODU alignment method.

FIG. 6 displays an example method for aligning the ODU with multiple satellites. FIG. 6 includes method 600. The method 600 begins at start block 605. Next, the method 600 continues to block 610, which recites "receive signal power information for a multi-satellite outdoor antenna reflector unit (ODU)." After block 610, the method 600 proceeds to block 615, which states "based on the signal power information, determine a first peak angle for the ODU to establish a first satellite link with the first satellite." Next, the method progresses to block 620, which states "based on the signal power information, determine a second peak angle for the ODU to establish a second satellite link with the second satellite."

Next, the method continues to block 625, which recites "determine an average peak angle based at least in part on the determined first peak angle and second peak angle." After block 625, the method continues with block 630, which states "provide on a graphical user interface an indication of the average peak angle to facilitate alignment of the ODU to concurrently establish both the first and the second satellite links." After block 630, the method 600 terminates at the "end" block 635.

Although FIG. 6 displays several steps for method 600, in some embodiments, method 600 includes more, less, and/or different steps than the steps displayed in FIG. 6. For example, method 600 may include additional steps to determine additional peak angles for additional satellite links. In particular, the method 600 could include steps to determine a $3^{rd}$ peak angle, a $4^{th}$ peak angle, or as many peak angles as may be needed for aligning the ODU.

For another example, for step 630, the average peak angle could be provided on a user interface as a number of screw turns. Also, for step 630, the method 600 may specify providing an indication of the average peak angle to another device, as opposed to "providing on a graphical user interface an indication of the average peak angle." Other variations of method 600 are also possible.

Also, the steps for method 600 displayed in FIG. 6 may be executed in a different order than the order described or shown in FIG. 6. For example, steps 615 and 620 may be performed at the same time as part of a data acquisition process by the system.

Method 600 could be performed by one or more computing devices. For example, the method 600 could be performed by a remote server, a peak angle calculation device, an installation meter, a signal quality meter, a power meter, a signal power measurement device, a subscriber device, an installer device, a smart phone, a personal computer, a laptop computer, a tablet computer, a personal digital assistant (PDA), a smartwatch, smart glasses, some other computing device, or some combination of the aforementioned devices.

Figure 7:
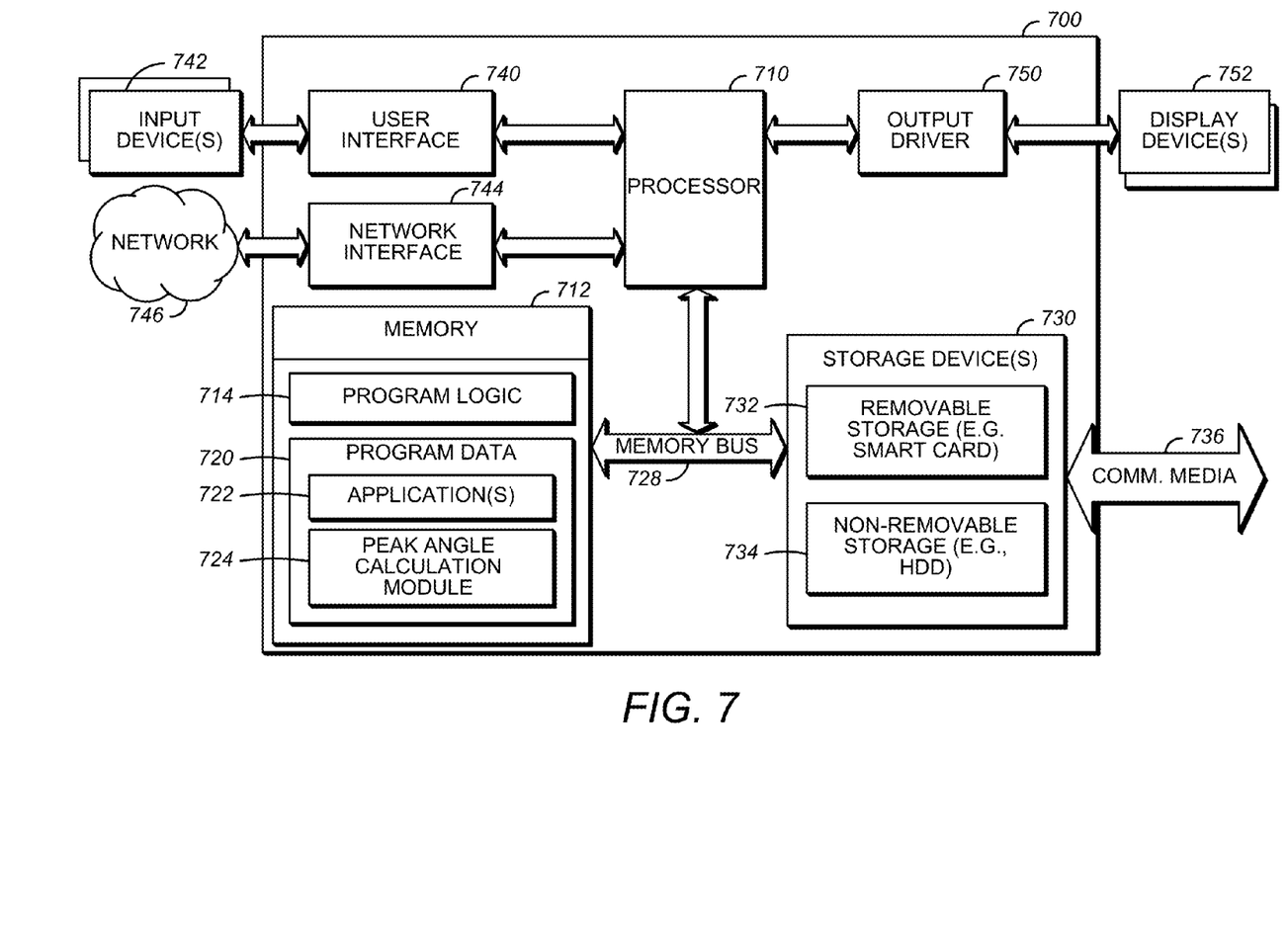
FIG. 7 illustrates an example block diagram of a computing device.

VII. Example Computing Device Executing the Method for Fine Alignment of an ODU to Multiple Satellites FIG. 7 is a functional block diagram that illustrates a computing device 700 used in a fine alignment of an ODU that receives signals from multiple satellites in accordance with embodiments described herein. Computing device 700 may take a variety of forms. In one example, computing device 700 may comprise or be arranged as a peak angle calculation device (such as peak angle calculation device 185 of FIG. 1). In another example, computing device 700 may comprise or be arranged as a set-top box (such as set-top box 120 of FIG. 1). The set-top box may be used for television or other media. As another example, computing device 700 may comprise or be arranged as a landline or cellular telephone, smartphone, personal computer, laptop computer, tablet computer, personal digital assistant (PDA), portable media player, smartwatch, smart glasses, power meter, installation meter, signal quality meter, signal power measurement device, or other computing device now known or later developed.

Computing device 700 may include a processor 710, a memory 715, one or more storage devices 730, a user interface 740, a network interface 744, and an output driver 750. Although, a particular configuration of computing device 700 is illustrated, the configuration is merely representative of various possible receiving devices. The components described in FIG. 7 may be communicatively linked by a system bus, network, or other connection mechanism.

Processor 710 may be any type of one or more processors, such as a microprocessor, a microcontroller, a digital signal processor (DSP), central processing unit (CPU), graphics processing unit (GPU), multicore processor, etc. Processor 710 may be used to coordinate or control components of computing device 700 that may or may not be illustrated in FIG. 2. In some implementations, processor 710 may include an internal memory controller (not illustrated). Yet other implementations may include a separate memory controller that can be used with processor 710.

A memory bus 228 can be used for communicating between the processor 710 and memory 712. Memory 712 may be any suitable type of memory. For example, memory 712 may include a non-transitory computer-readable medium, for example, such as computer-readable media that stores data for short periods of time like solid-state memory, flash drives, register memory, processor cache and Random Access Memory (RAM). The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium or a tangible storage device.

Memory 712 may include program logic 714 and program data 720. Program logic 714 may include programming instructions, such as computer executable or logic-implemented instructions. In some examples, the programming instructions may be provided or otherwise obtainable in a downloadable format, such as via network 746 (which may be illustrated as network 195 in FIG. 1E). Program data 720 may include program information that can be directed to various data types. For instance, program data 720 may include one or more applications 722 that may execute one or more processes arranged to provide input components of computing device 700, in accordance with the present disclosure.

Program data 720 may also include peak angle calculation module 724. When executing module 724, the processor 710 may execute one or more steps of the method 600 displayed in FIG. 6. In one embodiment, when the processor 710 executes module 724, the processor 710 executes method 600, including steps 605, 610, 615, 620, 625, 630, and 635. In other embodiments, when the processor 710 executes module 724, the processor 710 may only execute some of the steps of method 600, while another one or more computing devices executes the remaining steps of method 600.

In some implementations, memory 712 may be distributed between one or more locations. For example, at least a portion of memory 712 may reside within processor 710. In another example, all or part of memory 712 may reside on a storage device 730. Storage device 730 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data. In some embodiments, computing device 700 may not include storage device 730.

Computing device 700 may also include a user interface 740 that is configured to allow a customer to interact with computing device 700 via one or more input devices 742. Examples of input device 742 may include a remote control (or more simply, a remote), keyboard, a computer mouse, one or more push buttons, a touch screen, a smart phone, a smart watch, smart glasses, a tablet PC, a voice activated interface, or the like. Input device 742 may be used, for example, to select a channel, select information, change the volume, change the display appearance, or other functions using user interface 740. The process of making a selection with input device 742 may take a variety of forms, such as an action by a subscriber. In some embodiments, user interface 740 can include devices for providing audible and/or visual indications; e.g., loudspeaker(s), LED(s), LCD screen(s), and/or light bulb(s).

Computing device 700 may include network interface 744 for communicating data through one or more networks 246. Network interface 744 may take a variety of forms. For example, network interface 744 may be a WiFi, WiMax, WiMax mobile, data over cable service interface specification (DOCSIS), wireless, cellular, or other types of interfaces. Moreover, network interface 744 may use a variety of protocols for communicating via the network 746. For instance, network interface 744 may communicate using Ethernet, a Transmission Control Protocol/Internet Protocol (TCP/IP), a hypertext transfer protocol (HTTP), or some other protocol.

Computing device 700 may be coupled to a display 752. Display 752 may be a television, monitor, or other device configured to display images. The images may be video, graphics, text, or any variety of other visual representations. In some examples, the display 752 may include an audio output, such as a loudspeaker, to generate sound waves from media signals received by display 752. Alternatively, display 752 may be integrated into computing device 700.

Display 752 may communicate with an output driver 750 within computing device 700 to facilitate communication between computing device 700 and display 752. In some implementations, output driver 750 may work in conjunction with a graphics processing unit (not illustrated), which can be configured to communicate with display device 752. Output driver 750 can communicate with display device 752 by a high-definition multiple interface (HDMI) cable, a coaxial cable, some other wired communication link, or wirelessly. In some embodiments, computing device 700 does not include an output driver 750 for communication with display 752.

In some examples, computing device 700 may communicate directly or indirectly with one or more additional devices using a communication media 736. A communication connection is one example of a communication media 736. Communication media 736 may be embodied by computer-readable instructions, data structures, program modules, or other data in a modulated data signal, such as a carrier wave or other transport mechanism. The communication media 736 may also include wireless, optical, or other information delivery media. A modulated data signal can be a signal that has one or more of its characteristics set or changed in such a manner to encode information in the signal. By way of example, and not limitation, communication media 736 can include wired media such as a wired network or direct-wired connection, and wireless media such as acoustic, radio frequency (RF), infrared (IR) or other wireless media. The communication may include a cellular or cellular data connection, a satellite data connection, etc.

VIII. Conclusion

While the methods described herein illustrate a number of blocks that are in a sequential order, these blocks may also be performed in parallel or in a different order than those described herein. Also, the various blocks may be combined into fewer blocks, or divided into additional blocks. In addition, it should be understood that the flow diagrams show functionality and operation of possible implementations of the present embodiments, though other implementations are also possible. Moreover, each block in the flow diagrams may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
    receiving signal power information for a multi-satellite outdoor antenna reflector unit (ODU);
    based on the signal power information, determining, by a computing device, a first peak angle for the ODU to establish a first satellite link with a first satellite;
    based on the signal power information, determining, by the computing device, a second peak angle for the ODU to establish a second satellite link with a second satellite;
    determining an average peak angle based at least in part on the determined first peak angle and second peak angle; and providing, on a graphical user interface, an indication of the average peak angle to facilitate alignment of the ODU to concurrently establish both the first and the second satellite links.

2. The method of claim 1, wherein receiving the signal power information comprises:
for each of the first and the second satellite link, receiving at least three signal power measurements, wherein the three signal power measurements are determined at three different orientations of the ODU with respect to the corresponding one of the first and the second satellite.

3. The method of claim 1, wherein the first satellite transmits signals within a frequency band of 18.3 Gigahertz to 20.2 Gigahertz.

4. The method of claim 1, wherein providing the indication of the average peak angle on the graphical user interface comprises:
providing, on the graphical user interface, the average peak angle as a number of screw turns.

5. The method of claim 1, wherein the first satellite link is characterized by a right hand circular polarization.

6. The method of claim 5 further comprising:
determining a third peak angle to establish a third satellite link with the first satellite, wherein the third satellite link is characterized by a left hand circular polarization;
wherein the determining of the average peak angle is further based on the third peak angle.

7. The method of claim 1, wherein the average peak angle is for alignment of the ODU in elevation.

8. A non-transitory computer-readable medium storing instructions that are executable by one or more computing devices, wherein executing the instructions causes the one or more computing devices to perform functions comprising:
receiving signal power information for a multi-satellite outdoor antenna reflector unit (ODU);
based on the signal power information, determining a first peak angle for the ODU to establish a first satellite link with a first satellite;
based on the signal power information, determining a second peak angle for the ODU to establish a second satellite link with a second satellite;
determining an average peak angle based at least in part on the determined first peak angle and second peak angle; and
providing, on a graphical user interface, an indication of the average peak angle to facilitate alignment of the ODU to concurrently establish both the first and the second satellite links.

9. The non-transitory computer-readable medium of claim 8, wherein receiving the signal power information comprises:
for each of the first and the second satellite link, receiving at least three signal power measurements, wherein the three signal power measurements are determined at three different orientations of the ODU with respect to the corresponding one of the first and the second satellite.

10. The non-transitory computer-readable medium of claim 8, wherein the first satellite transmits signals within a frequency band of 26.18.35 Gigahertz to 20.2 Gigahertz.

11. The non-transitory computer-readable medium of claim 8, wherein providing the indication of the average peak angle on the graphical user interface comprises:
providing, on the graphical user interface, the average peak angle as a number of screw turns.

12. The non-transitory computer-readable medium of claim 8, wherein the first satellite link is characterized by a right hand circular polarization.

13. The non-transitory computer-readable medium of claim 12, wherein the instructions cause the computing device to perform functions further comprising:
determining a third peak angle to establish a third satellite link with the first satellite, wherein the third satellite link is characterized by a left hand circular polarization;
wherein the determining of the average peak angle is further based on the third peak angle.

14. The non-transitory computer-readable medium of claim 8, wherein the average peak angle is for alignment of the ODU in elevation.

15. A system comprising:
a multi-satellite outdoor antenna reflector unit (ODU);
a signal power measurement device that determines a signal power of a signal received by the ODU; and
a peak angle calculation device comprising:
a processor; and
a memory storing instructions that when executed by the processor cause the device to perform functions comprising:
receiving signal power information for the ODU;
based on the signal power information, determining a first peak angle for the ODU to establish a first satellite link with a first satellite;
based on the signal power information, determining a second peak angle for the ODU to establish a second satellite link with a second satellite;
determining an average peak angle based at least in part on the determined first peak angle and second peak angle; and
providing an indication of the average peak angle to facilitate alignment of the ODU to concurrently establish both the first and the second satellite links.

16. The system of claim 15, wherein receiving the signal power information comprises:
for each of the first and the second satellite link, receiving at least three signal power measurements, wherein the three signal power measurements are determined at three different orientations of the ODU with respect to the corresponding one of the first and the second satellite.

17. The system of claim 15, wherein the first satellite transmits signals within a frequency band of 18.3 Gigahertz to 20.2 Gigahertz.

18. The system of claim 15, wherein providing the indication of the average peak angle comprises:
providing the average peak angle as a number of screw turns.

19. The system of claim 15, wherein the first satellite link is characterized by a right hand circular polarization.

20. The system of claim 19 further comprising:
determining a third peak angle to establish a third satellite link with the first satellite, wherein the third satellite link is characterized by a left hand circular polarization;
wherein the determining of the average peak angle is further based on the third peak angle.

* * * * *